Patented Mar. 27, 1934

1,952,703

UNITED STATES PATENT OFFICE 1,952,703

PURIFICATION OF HYDROCARBON OILS

Carbon P. Dubbs, Chicago, Ill., assignor to Universal Oil Products Company, Chicago, Ill., a corporation of South Dakota No Drawing. Original application June 29, 1925, Serial No. 40,455. Divided and this application July 11, 1930, Serial No. 467,393

2 Claims. (Cl. 196—28)

This application is a division of my application Serial No. 40,455, filed June 29, 1925, now Patent No. 1,787,570.

This invention relates to the purification of hydrocarbon oils, and refers more particularly to the removal of objectionable sulphurous, odoriferous and other deleterious compounds which render the products of the distillation of hydrocarbon oils under heat objectionable, either from the standpoint of odor or instability.

In recent years oils have been subjected to high temperatures, under high pressures in what is known as cracking, in order to produce products having a relatively lower boiling point range. The distillate and products obtained from the distillation of these hydrocarbon oils under heat and pressure at the present time are being subjected to several methods of refining, none of which seem to be entirely satisfactory. For instance, with oils having a high sulphur content, this sulphur content may be reduced by subjecting the oil to the action of large quantities of strong sulphuric acid. This sulphuric acid is not only expensive, but its use results in an excessive loss of oil due to the oil being taken out by the acid. This excessive loss is probably due to the fact that knowledge is limited as to what sulphur compounds exist in the said distillate.

I believe that when the charging oil is subjected to cracking temperatures, a high percentage of the sulphur contained in that oil which comes overhead with the vaporizable fractions of said charging oil is in the form of sulphureted hydrogen produced by the combination of the sulphur with the hydrogen of the oil. This sulphureted hydrogen can be very readily and economically removed from the distillate.

However, there are other sulphur compounds formed which are very difficult to remove from the distillates. It is my belief that these latter sulphur compounds are principally carbon bisulphide, these carbon bisulphides being formed even when low temperatures are used. It must be borne in mind that the carbon formed in cracking the charging oil, is formed by cracking said oil in the presence of the sulphur contained therein, and that the carbon thus liberated being in a nascent state is in an ideal condition to combine with part of the sulphur to form carbon bisulphide.

I have ascertained that when a certain oil is treated containing a known amount of sulphur, at a low cracking temperature, that the difficulty of removing the sulphur from the distillates produced therefrom, is not nearly as great as when the same oil with the same amount of sulphur is subjected to higher cracking temperatures. My observation further indicates that as the cracking temperature maintained on the charging oil increases, the action of removing the sulphur from the distillate produced therefrom, increases until a maximum temperature is reached, at which time all the sulphur is thus affected.

It is to be understood that my invention is applicable to all substances which contain sulphur, and which are subjected to cracking temperatures to produce a liquid motor fuel.

One of the standard methods for treating the distillate products of petroleum oil, is to subject these products separately to the action of sodium plumbite, sulphuric acid, caustic soda, with intervening water washes, the choice of succession of steps for introducing these refining agents being regulated at will by the refiner. The product may then be subjected to steam distillation. This standard method of treatment effectively removes all of the sulphureted hydrogen that may be in solution in said distillate, and possibly part of the carbon bisulphide and other deleterious compounds. It has been found however, that unless, as heretofore pointed out, an excessive amount of sulphuric acid is used which results in an excessive loss of distillate, that the finished product will still contain a large percentage of sulphur and will be unstable, going off color on standing, particularly when exposed to the sunlight.

In my opinion, this is due to the carbon bisulphide compounds remaining in the distillate. It is a known fact that carbon bisulphide has a low vaporizing temperature. Therefore, one would be led to believe that if there is any carbon bisulphide in the oil, it would be distilled over with the overhead product from the steam distillation.

As far as my present investigation goes, this is apparently what happens—at least some of the carbon bisulphides distill over with the overhead product, and possibly the remainder stays in the still held there by some chemical combination with the residue, which combination is not broken down until higher temperatures are used. Part of the carbon bisulphide distilling over with the overhead product of the steam distillation is dissolved out of said overhead product with the steam as the overhead product is condensed, said carbon bisulphide being carried out in the water. In other words, the overhead product is thoroughly scrubbed with the water of the steam and while the carbon bisulphide is but very slightly soluble in water, yet, there is such a small trace of it in the overhead product and such a great number of pounds of steam used per pound of overhead vapors, that it would be sufficient to remove a great deal of this carbon bisulphide.

To overcome many of the difficulties enumerated in the foregoing explanation, and as a feature of the present invention, the distillate produced from cracking may be subjected to calcium hydrosulphide mixed with water, the formula of which is $$Ca(SH)_2 + H_2O.$$

said calcium hydrosulphide mixed with water being converted into calcium hydroxyhydrosulphide, which further reacts with carbon bisulphide as follows:

$$2CaOH,SH + CS_2 = SH_2 + Ca(OH)_2, CaCS_3.$$

It may be that this compound is not a pure compound of carbon bisulphide, but the compound that may be causing all the trouble is one that readily breaks down to carbon bisulphide.

My invention contemplates various methods of subjecting said distillate to the above treatment, and includes as one of the features of the invention the process of passing the undesirable gases and distillate produced from cracking separately or together through a solution of calcium hydrate preferably, but not necessarily, as these products are discharged from the cracking plant. If desirable, sugar may be added to the calcium hydrate solution in order to make the calcium hydrate more soluble in water, if it is preferred to maintain this calcium hydrate solution at an elevated temperature. The sulphureted hydrogen contained in the uncondensable gas and in the distillates produced from the cracking reaction reacts with the calcium hydrate to form calcium hydrosulphide—$Ca(OH)_2$ plus $2H_2S$ forming $Ca(SH)_2$ plus $H_2O$, thus forming the above described hydroxyhydrosulphide—which latter reacts with carbon bisulphide as follows:

$$2CaOH,SH \text{ plus } CS_2 = SH_2 \text{ plus } Ca(OH)_2, CaCS_3.$$

It may be found advantageous to charge the uncondensable gas and distillate first to a tank containing calcium hydrate where the sulphureted hydrogen and hydrohydrosulphide is formed, second—in then diverting the distillate and uncondensable gases to a second tank containing the calcium hydrate to form another similar reaction; third—in then passing the gas and distillate, or the distillate alone from this second tank back to the first tank so that the hydroxyhydrosulphide may react with the carbon bisulphide and then pass with the distillate or the distillate and gas through a third tank containing calcium hydrate to remove the sulphureted hydrogen. The success of this reaction will be dependent upon bringing the gases and distillate into intimate contact with the calcium hydrate solution and hydroxyhydrosulphide so that the sulphur content in the distillate and gas may be acted upon by these chemicals. Mechanical washers may be interposed between the separate tanks if found desirable, and other devices for washing and mixing the chemicals with the distillate and gas may be employed.

By the above method of treatment, it will be readily seen that the sulphureted hydrogen which is a very objectionable compound is not only extracted from the gas and distillate, but is utilized when removing the other objectionable compounds in the distillate and gas which are not removed directly by the calcium hydrate.

It will be readily seen therefore, that in order to carry on the process, it is only necessary to purchase calcium hydroxide, which is a relatively non-expensive chemical.

If found desirable, the distillate may then be thoroughly washed and subjected to a weak solution of sulphuric acid and caustic. If the distillate then has the required final boiling point, it is ready for the market. If this final boiling point is too high, the distillate can be subjected to the usual steam distillation.

Practically the same results can be obtained by using instead of calcium hydrate, ammonium sulphide in the presence of polysulphides which combine and eventually form ammonium thiocarbonate. When using ammonium sulphide I may inject this aqueous solution into the vapors of the low boiling point distillate mingled with the uncondensable gases at a point where they enter the condensing coil, or at any other point. Ammonium sulphide in the presence of sulphureted hydrogen gas will react with the carbon bisulphide compounds in the oil and the condensed distillate may then be washed and subjected to a light acid treatment. It will be found that the sulphur content of the low boiling point distillate will have been almost entirely, if not completely, removed.

I claim as my invention:

1. In a process of cracking hydrocarbon oil in which cracked vapors of a low boiling hydrocarbon distillate are produced and subjected to condensation, a step in the method of removing sulphurous compounds from said distillate, which comprises injecting an aqueous solution of ammonium sulphide into the cracked vapors of the low boiling hydrocarbon distillate mingled with the uncondensable gases at a point where they enter the condensing zone, whereby the ammonium sulphide in the presence of sulphureted hydrogen gas evolved in the process will react with carbon bisulphide compounds in the oil eventually forming ammonium thiocarbonate.

2. In a process of cracking hydrocarbon oil in which cracked vapors of a low boiling hydrocarbon distillate are produced and subjected to condensation in a condensing coil, the method of removing sulphurous compounds from said distillate, which consists in injecting an aqueous solution of ammonium sulphide into the cracked vapors of the low boiling hydrocarbon distillate mingled with the uncondensable gases at a point where they enter the condensing coil, whereby the ammonium sulphide in the presence of sulphureted hydrogen gas evolved in the process will react with carbon bisulphide compounds in the oil eventually forming ammonium thiocarbonate, and washing the condensed distillate and subjecting it to a light acid treatment.

CARBON P. DUBBS.